United States Patent [19]

Holmquist

[11] Patent Number: 5,793,809

[45] Date of Patent: Aug. 11, 1998

[54] TRANSPARENT TECHNIQUE FOR MU-LAW MODEMS TO DETECT AN ALL-DIGITAL CIRCUIT CONNECTION

[75] Inventor: Kurt Ervin Holmquist, Largo, Fla.

[73] Assignee: Paradyne Corporation, Largo, Fla.

[21] Appl. No.: 457,881

[22] Filed: May 31, 1995

[51] Int. Cl.$^6$ .................................................. H04B 14/04
[52] U.S. Cl. .................................. 375/242; 375/222
[58] Field of Search .......................... 375/222, 216, 375/219, 242, 358, 224, 295, 316; 379/93, 97, 98, 1, 34, 93.01, 93.08; 370/69.1, 68.1, 110.1, 110.4, 111.14; 371/20.1, 15.1, 27

[56] References Cited

U.S. PATENT DOCUMENTS

| | | | |
|---|---|---|---|
| 5,214,637 | 5/1993 | Sridhar et al. | 375/222 |
| 5,267,300 | 11/1993 | Kao et al. | 379/93 |
| 5,311,578 | 5/1994 | Bremar et al. | 379/97 |
| 5,347,539 | 9/1994 | Sridhar et al. | 375/222 |
| 5,448,574 | 9/1995 | Yamaguchi | 371/20.1 |
| 5,463,661 | 10/1995 | Moran, III et al. | 375/222 |
| 5,528,679 | 6/1996 | Taarud | 379/34 |

*Primary Examiner*—Tesfaldet Bocure
*Attorney, Agent, or Firm*—Thomas, Kayden, Horstemeyer & Risley

[57] ABSTRACT

A transmitting Mu-law modem creates a probe signal by modifying the 7th bit of each of a number of PCM samples during the "hand-shaking" phase of a data connection. Furthermore, the transmitting Mu-law modem only makes this modification on those PCM samples that fall into the range of segment 1 as defined in CCITT Recommendation G.711. Similarly, a receiving Mu-law modem searches for this known pattern. Upon detection of this pattern, the receiving Mu-law modem provides an acknowledgment signal and both modems subsequently switch to a digital-mode of operation. On the other hand, if, in fact, there is a least one analog link in the data connection, the probe signal becomes distorted and, since the receiving Mu-law modem does not detect the probe signal, handshaking is completed in the standard fashion.

8 Claims, 5 Drawing Sheets

TRANSPARENT TECHNIQUE FOR MU-LAW MODEMS TO DETECT AN ALL-DIGITAL CIRCUIT CONNECTION

BACKGROUND OF THE INVENTION

The present invention relates to data communications equipment, e.g., modems, and, more particularly, to Mu-law modems.

A "Mu-law modem" is identical to an analog modem with the exception that the Mu-law modem does not have an analog interface to the public switched telephone network (PSTN). Instead, the Mu-law modem couples to the PSTN via a digital interface. Typically, an end user utilizes a Mu-law modem behind a customer-premises private branch exchange (PBX), which itself is connected to the PSTN via wideband digital facilities like T1, etc. In such an arrangement, the Mu-law modem can be coupled to the PBX over in-house wiring or the modem can be physically resident in the PBX itself.

Whether coupled to the PBX or physically in the PBX, the Mu-law modem generates a 64 thousand bit per second (kbps) DS0 data stream for transmission through the PSTN to a far-end, or remote, data endpoint of a data connection. As known in the art, this DS0 data stream is a sequence of pulse-code modulated (PCM) samples using the same analog-to-digital sampling and encoding technique used by the PSTN for transmission of voice-band signals through the PSTN. Specifically, the digital signal processor of the Mu-law modem uses either of the standard companding encoding schemes, Mu-law or A-law, as defined in CCITT Recommendation G.711, to produce the DS0 data stream. This DS0 data stream transits the PSTN exactly like those DS0 streams created at the central office/local loop interface of the PSTN.

The obvious benefits of using a Mu-law modem are (1) superior performance since echoes and other impairments are eliminated from one end of the data connection and (2) lower cost, smaller size, etc. due to the elimination of the analog interface from the modem.

In addition, another benefit of using a Mu-law modem is the possibility of data transmission at speeds approaching the DS0 data rate. Unfortunately, this requires a completely digital connection between the two data endpoints—which cannot be guaranteed. For example, the PSTN itself might include an analog facility as part of the data connection. In addition, the other data endpoint is typically coupled to the PSTN via an analog local loop, which results in the DS0 data stream being converted back to a voice-band analog signal. As a result, the actual data rate of the data connection is limited to standard analog-based data transmission rates.

However, with the increased deployment of all-digital facilities both in the PSTN and into customer premises, it can be expected that there will be an increasing frequency of data connections in which there are no analog links between the data endpoints. These "Mu-law modem to Mu-law modem" data connections offer the opportunity to greatly increase the effective data transmission rate by taking advantage of this all-digital connection.

Unfortunately, the PSTN does not provide notification to a Mu-law modem when the data connection is entirely digital. As a result, a Mu-law modem cannot determine when an all-digital connection exists. Consequently, a Mu-law modem is limited to standard analog-based data transmission unless a priori a particular data connection is known to be all-digital. Such a situation might exist in a dedicated "point-to-point" data connection. In this instance, the Mu-law modem can be manually administered to a digital mode of operation.

Indeed, even if the modem endpoints could identify themselves to each other, this still does not solve the problem of whether the connection is all-digital. For example, U.S. Pat. No. 5,311,578, issued May 10, 1994, to Bremer et al., entitled "Technique for Automatic Identification of a Remote Modem," describes the use of a "low-level" identification signal within an industry standard answer tone to identify the answering modem. This technique would allow a Mu-law modem to recognize what type of modem was at the opposite end -but identifying the modem at the opposite end does not guarantee that intervening data connection is completely digital.

SUMMARY OF THE INVENTION

I have realized a technique that allows a pair of Mu-law modems to determine whether they have established a data connection that consists entirely of digital transmission links. In particular, a probe signal is transmitted from one Mu-law modem to the other Mu-law modem. This probe signal is selected such that the presence of an analog link distorts the probe signal—with the result that the probe signal can no longer be reliably detected by the receiving DCE. As a result, reception and detection of this probe signal by the other Mu-law modem ensures to a degree the existence of an all-digital connection. Once the probe signal is detected, the Mu-law modems can then switch to transmission of data in purely digital form thereby increasing the maximum possible data rate to 56 kbps or more.

In an embodiment of the invention, the transmitting Mu-law modem creates this probe signal by modifying the 7th bit of each of a number of PCM samples during the "hand-shaking" phase of the data connection. Furthermore, the transmitting Mu-law modem only makes this modification on those PCM samples that fall into the range of segment one as defined in CCITT Recommendation G.711. Similarly, the receiving Mu-law modem searches for this known pattern. Upon detection of this pattern, the receiving Mu-law modem provides an acknowledgment signal and both modems subsequently switch to a digital-mode of operation. On the other hand, if, in fact, there is a least one analog link in the data connection, the probe signal becomes distorted and, since the receiving Mu-law modem does not detect the probe signal, handshaking is completed in the standard fashion.

In accordance with a feature of the invention, the above-described technique is "transparent." The term "transparent" means that if a modem using this technique is connected via a data connection with one or more analog spans or is connected to a modem which has not implemented this technique, normal operation in the standard manner of a dial modem is not impaired. For example, if the receiving modem is a standard analog modem or is not a compatible Mu-law modem, the contents of this low significance bit simply resembles noise and, again, handshaking is completed in the standard fashion.

DETAILED DESCRIPTION

Figure 1:
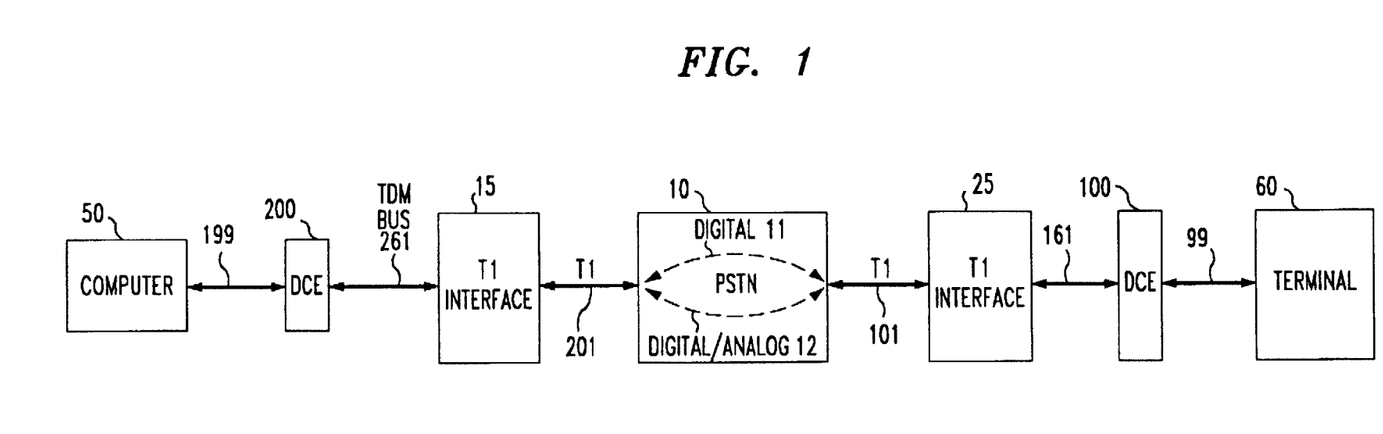
FIG. 1 is a block diagram of a switched point-to-point data communications system embodying the principles of the invention.

A switched point-to-point data communications system embodying the principles of the invention is shown in FIG. 1. In the following example, it is assumed that a calling party located at data terminal equipment (DTE) 50 initiates a data call to DTE 60 via data communications equipment (DCE) 200, T1 Interface 15, PSTN 10, T1 interface 25, and DCE 100. For the purposes of this example, both DCE 200 and DCE 100 are Mu-law modems. Further, although the type of DTE is not relevant to the inventive concept, each DTE is a personal computer. The communications channel includes PSTN 10, and T1 facilities 101 and 201, which are representative of digital facilities. In this example, T1 facility 201 terminates in T1 interface 15, which is assumed to be co-located with DCE 200. T1 interface 15 can be a stand-alone piece of equipment or part of a digital PBX. T1 facility 201 conveys a T1 signal from the respective terminating central office (not show) within PSTN 10. A T1 signal includes a plurality of channels, only one of which is assigned to DCE 200. (Although not shown, T1 facility 201 is actually shared among a plurality of DCEs, of which DCE 200 is one. Like DCE 200, described below, these other DCEs access T1 facility 201 via time-division-multiplexed (TDM) bus 261 and T1 interface 15.) A similar description applies to T1 facility 101 which terminates in T1 interface 25. Finally, it is assumed that any data call through PSTN 10 takes one of two possible types of paths. The first path is represented by path 11, which is representative of a path that only includes digital facilities. The second path is represented by path 12, which includes not only digital facilities but at least one analog facility as well.

Figure 2:
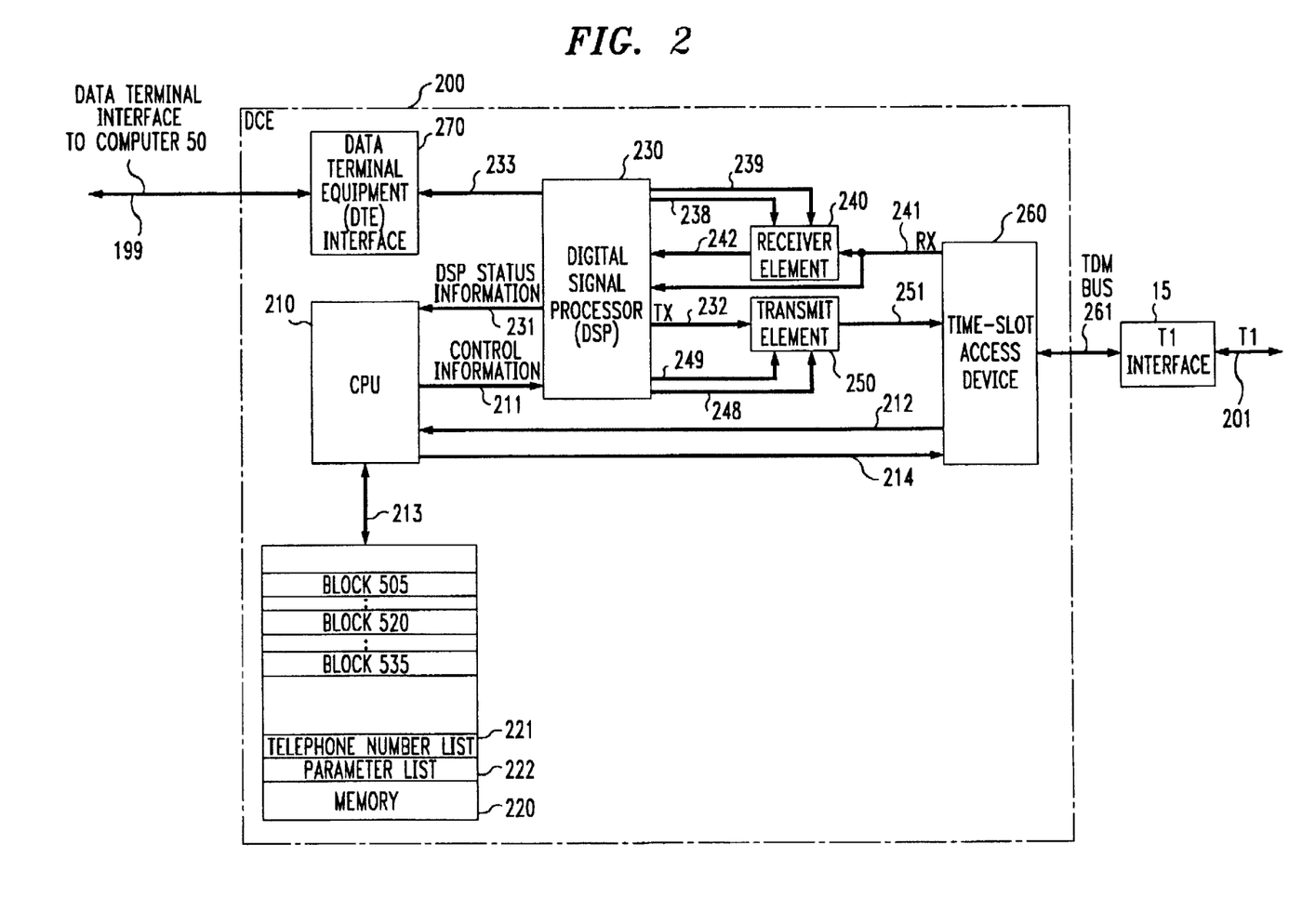
FIG. 2 is a block diagram of data communications equipment 200 embodying the principles of the invention.

In this example, both DCE 200 and DCE 100 embody the principles of the invention. As such, only DCE 200 will be described in detail. As noted above, DCE 200 is a Mu-law modem, which is shown in block diagram form in FIG. 2. Other than the inventive concept, the components of DCE 200 are well-known. DCE 200 comprises memory 220, CPU 210, Digital Signal Processor (DSP) 230, time-slot access device 260, and data terminal equipment interface 270. In accordance with the principles of the invention, DCE 200 also includes transmit element 250 and receiver element 240. CPU 210 is a microprocessor-based central processing unit, which operates on, or executes, program data stored in memory 220, via path 213. Memory 220 is representative of random access memory (RAM), and comprises a number of representative storage locations, of which a subset is shown in FIG. 2. For example, storage location 505 corresponds to that portion of memory that stores instructions and data associated with implementing step 505 of FIG. 3, described below. Time slot access device 260 provides information to, and receives information from, T1 interface 15, via TDM bus 261. In addition, as known in the art, time slot access device 260 receives signaling information from T1 interface 15, via TDM bus 261. This signaling information includes the identification of the particular time slot of TDM bus 261 that is assigned to DCE 200 and includes other information like "Automatic Number Identification" (ANI), which represents the calling party's telephone number. Time slot access device 260 both removes and inserts data into the assigned time slot of TDM bus 261. This data is the above-described PCM signal. In particular, data extracted by time slot access device 260 from the assigned time slot is provided as a received signal, RX, to DSP 230 via line 241, block 240 and line 242. The received signal, RX, is a received form of the data signal transmitted by far-end DCE 100. Conversely, DSP 230 applies transmit signal TX to time slot access device 260, via line 232, transmit element 250 (described below), and line 251 for transmission to the far end.

Figure 3:
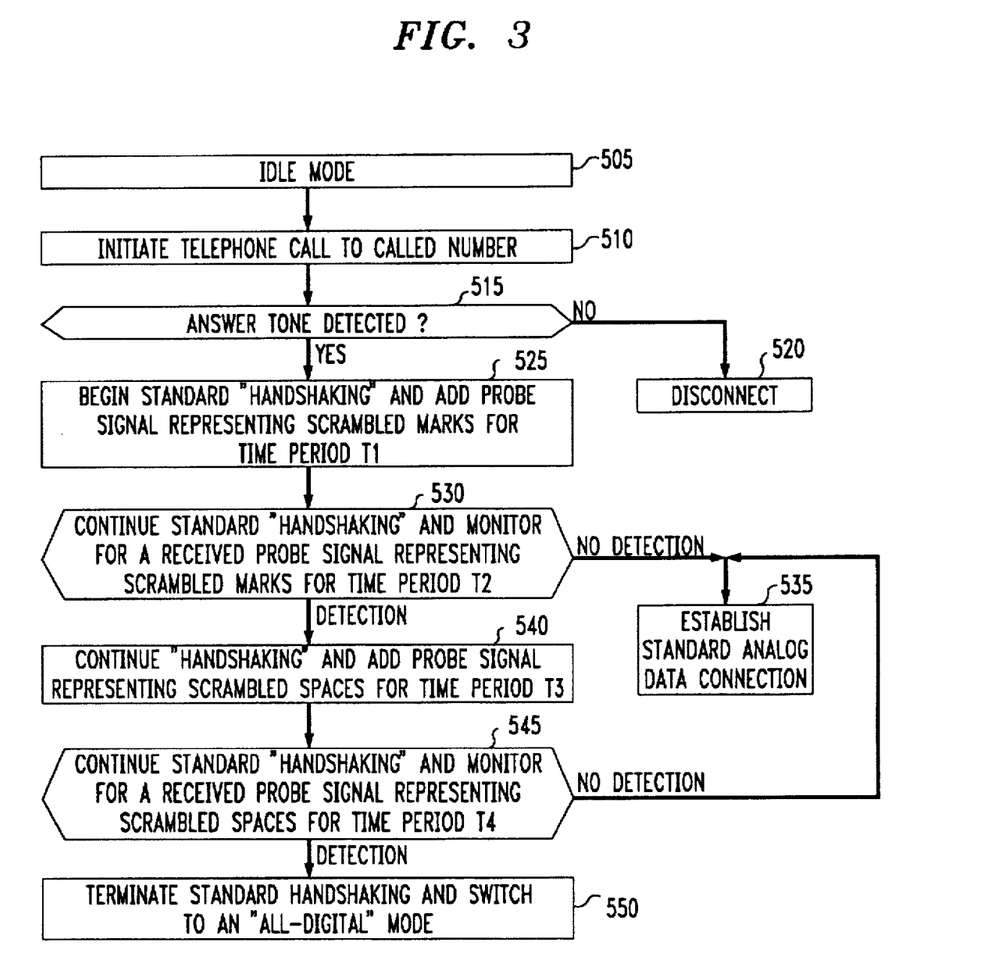
FIG. 3 is a flow diagram of an illustrative method embodying the principles of the invention for use in originating data communications equipment.
Figure 4:
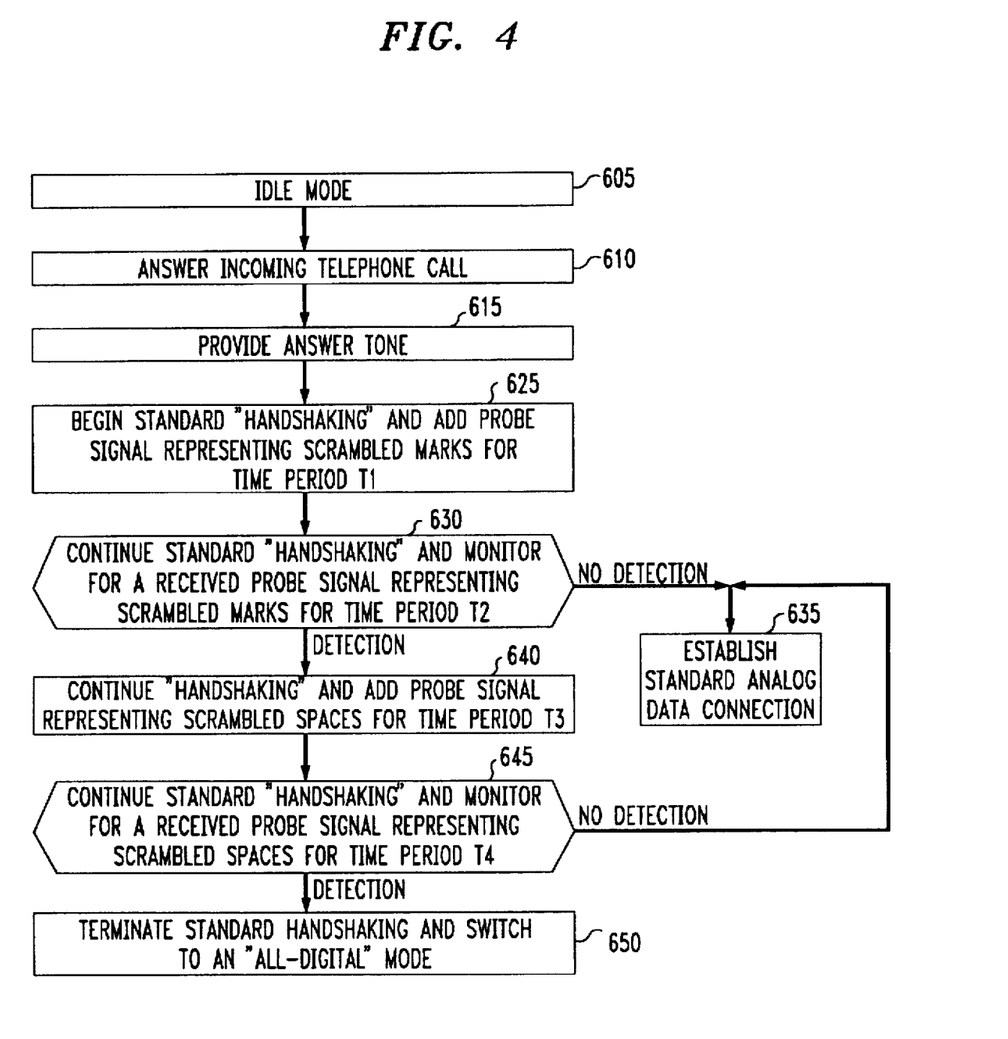
FIG. 4 is a flow diagram of an illustrative method embodying the principles of the invention for use in answering data communications equipment.

Before describing further the elements of DCE 200, the inventive concept will be generally described. In particular, in accordance with the inventive concept, a probe signal is transmitted from one Mu-law modem to the other Mu-law modem. Reception and detection of this probe signal by the other Mu-law modem ensures to a degree the existence of an all-digital connection. As described further below, the probe signal is selected such that the presence of an analog link distorts the probe signal—with the result that the probe signal can no longer be reliably detected by the receiving DCE. This inventive concept allows a Mu-law modem to "test" for an all-digital connection at the same time it is communicating using standard analog techniques. This is done in a way which does not interfere with the standard communication process. At the same time, it provides a positive indication to both Mu-law modems (provided they both have implemented this technique) to confirm not only that the data connection should be all-digital, but that the opposite modem also has recognized this condition. Once this state is reached, a transition to digital communications can be quickly made with little or no interruption, or corruption, of any data stream. Reference should now be made to FIGS. 3 and 4, which show illustrative methods for use in originating and answering DCEs in accordance with the principles of the invention.

The illustrative methods of FIG. 3 and FIG. 4 represent a simple interlocked handshake to provide positive confirmation of mutual recognition of an all-digital connection. Other methods are also possible. Since FIG. 4 is similar to FIG. 3, except for use in an answering DCE, only FIG. 3 is described in detail below.

DCE 200 begins in an idle mode in step 505. In step 510, DCE 200 initiates a data call to DTE 60. As is known in the art, this data call can be initiated in a number of ways, e.g., a user at DTE 50 can keyboard dial using the well-known "AT-command set." In step 515, DCE 200 waits for the standard answer tone, which DCE 100 provides upon answering the data call. If no answer tone is detected, DCE 200 disconnects in step 520, e.g., after a suitable time-out.

However, upon detection of an answer tone, DCE 200 begins handshaking in accordance with any one of a number of analog modem standards, e.g., CCITT V.32 bis, and, in accordance with the inventive concept, adds a probe signal in step 525 to any handshaking signals. In this example, the probe signal is a sequence of scrambled marks for a period of time $T_1$ (described further below). The transmission of the probe signal should start immediately after completion of the standard answer tone sequence to allow PSTN 10 to recognize that the telephone connection is being used for modem rather than voice signals. (It should be noted that the probe signal could be sent by the originating modem starting immediately after completion of dialing, and by the answering modem immediately after going off hook, to help minimize the time to detect the all digital circuit.) After step 525, DCE 200 continues the handshaking process, and the transmission of the probe signal, and further monitors for reception of a corresponding probe signal representing scrambled marks transmitted from DCE 100 in step 530.

If no received probe signal is detected for a period of time $T_2$ and before the handshaking process completes, DCE 200 simply establishes the data connection in accordance with the respective analog standard, e.g., V.32 bis, in step 535. Since, in this example, both DCE 100 and DCE 200 embody the inventive concept, the lack of detection of a probe signal by DCE 200 is representative of the data connection taking path 12, which contains at least one analog link, through PSTN 10. (Also, if DCE 100 did not embody the inventive concept, the lack of a detected probe signal could be due to DCE 100 simply being incompatible with the inventive technique, e.g., DCE 100 is a standard analog modem or a Mu-law modem that does not embody the inventive concept.)

However, if a received probe signal is detected for a period of time $T_2$, DCE 200 continues the standard handshaking and changes the probe signal to a sequence of scrambled spaces for a time period $T_3$ in step 540. After step 540, DCE 200 continues the handshaking process, and the transmission of the probe signal representing now scrambled spaces, and further monitors for reception of a corresponding probe signal representing scrambled spaces transmitted from DCE 100 in step 545. If no received probe signal is detected for a period of time $T_4$, DCE 200 simply establishes the data connection in accordance with the respective analog standard, e.g., V.32 bis, in step 535.

However, if a received probe signal is detected for a period of time $T_4$, DCE 200 terminates the standard handshaking procedure and switches to an all-digital mode of operation in step 550. Detection of this sequence of probe signals by DCE 200 is representative of the data connection taking path 11 (shown in FIG. 1), which is an all-digital connection to DCE 100. After switching to an all-digital mode of operation, transmission of data occurs in purely digital form as known in the art thereby increasing the maximum possible data rate to 56 kbps or more.

In accordance with the above-described inventive concept, transmit element 250 of DCE 200 (shown in FIG. 1) inserts the probe signal into the PCM data stream. An illustrative embodiment of transmit element 250 is shown in block diagram form in FIG. 5. Transmit element 250 includes selector 715, segment one detector 710, and sequence generator 705. The basic idea is simply for the transmitter of DCE 200 to modify the PCM data stream in a manner which results in the probe signal being interpreted as just noise by a receiving modem that is not "looking" for this pattern. This is done by imposing the modification on the bits in the PCM data stream that have the least significance when the data from the PCM signal is interpreted as a representation of an analog signal. However, since the modification is deterministic and has a bit error rate which is no worse than any of the other data, it can be recognized as a known pattern by a receiving Mu-law modem that embodies the inventive concept.

Figure 5:
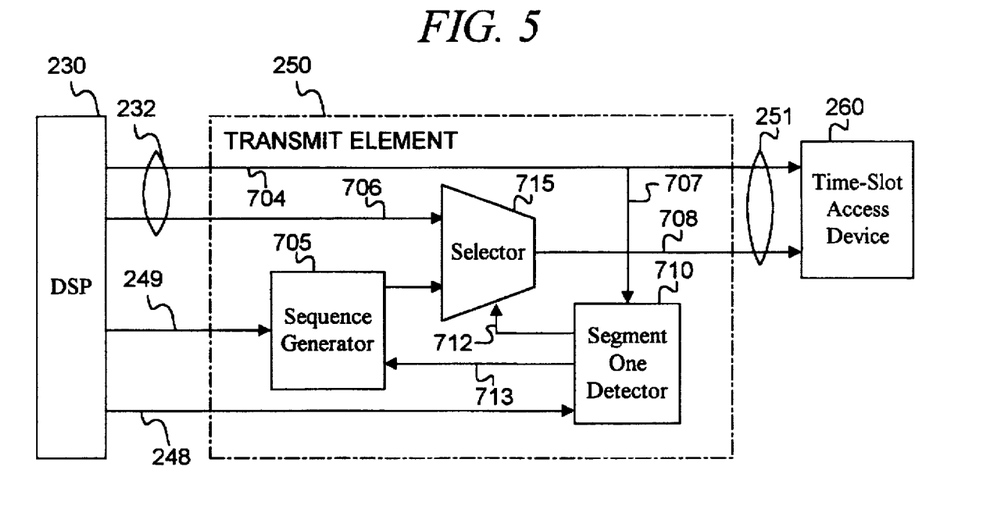
FIG. 5 is a block diagram of transmit element 250 of data communications equipment 200.

More specifically, transmit element 250 modifies only the 7th bit of the PCM samples (based on bit numbering given in G.711). (It should be noted that bit 8 is not used because this is sometimes used for inter-office signaling and framing, etc.) A means of identification of this bit is implicit in the required PCM framing. Furthermore, transmit element 250 only makes this modification on the samples which fall into the range of segment one (as defined in G.711) where the modifications have the least impact on the analog interpretation. (As defined in G.711, the higher the segment number of a PCM sample, the higher the signal level). Since the communication via these modifications requires very low bandwidth, the DCE 200 can use the opportunistic approach and wait for segment one samples to occur before applying the modification.

As described above in the context of FIGS. 3 and 4, it is proposed that the probe signal, or pattern, which is imposed on the 7th bit of the segment one samples consists of marks or spaces scrambled by a polynomial such as is typically used in modem scramblers and inter-DCE signaling techniques. The benefit of using this type of probe signal is that it resembles random data and can be easily detected with an almost arbitrarily low probability of false detection. If, in fact, the modem at the other end of the data connection is not sending the pattern, the contents of this low significance bit resembles a random data stream. Further, in the situation where one or more analog links exist, the probe signal is corrupted by the analog conversion process so that again the contents of this low significance bit resembles a random data stream. The likelihood of false detection of the all-digital connection can be reduced to a suitable level by extending the length of the pattern required for detection.

DSP 230 generates a sequence of 8-bit PCM samples, at the standard 8 kHz rate, on line 232, which provides each PCM sample in parallel, i.e., each bit of the 8-bit sample is provided on a separate signal path. Seven of these signal paths are represented by line 704, which couples to time-slot access device 260. The remaining bit of information, conveyed by line 706, is applied to selector 715. The latter either selects the PCM bit generated by DSP 230, via line 706, or, in accordance with the inventive concept, selects the data generated by sequence generator 705, via line 711, for application to time-slot access device 260, via line 708. The selection of the signal to convey to time-slot access device 260 is performed by segment one detector 710, which is also under the control of DSP 230. As will be appreciated by one skilled in the art from a review of FIG. 5, the segment one detector 710 generates a control signal 712 which controls the operation of the selector 715. Namely, the value of control signal 712 determines whether the selector 715 "selects" the value on line 711 (i.e., the probe signal) or the value on line 706 as the bit 7 value of the 8 bit PCM value that is sent to time-slot access device 260.

In accordance with the methods described above, DCE 200 initially disables, via line 248, segment one detector 710, e.g., while in the idle mode. When disabled, signal one detector 710 causes selector 715 to convey the signal on line 706 to time-slot access device 260. In other words, there is no modification to the 8-bit PCM samples provided by DSP 230 when segment one detector 710 is disabled. However, in step 525 of FIG. 3, DSP 230 enables, via line 248, segment one detector 710, which then monitors for the occurrence of segment one samples on signal lines 707. When a segment one sample is detected, segment one detector 710 controls selector 715 so that the signal on line 711 is conveyed to time-slot access device 260. Segment one detector 710 also provides a clock signal, via line 713, to sequence generator 705 to generate the signal on line 711 (ie., the probe signal), which now replaces the current bit 7 value of the 8-bit PCM value provided by DSP 230. The latter also controls, via line 249, sequence generator 705 to generate a scrambled marks or scrambled spaces signal based on the phase of the inter-modem exchange as described above. Once the transition to either all-digital mode or a standard analog mode, DSP 230 disables segment one detector 710.

Figure 6:
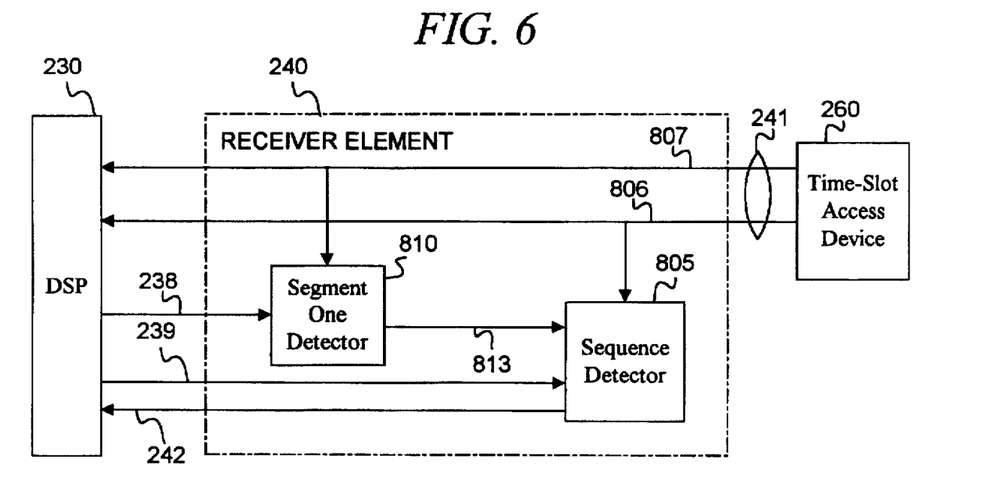
FIG. 6 is a block diagram of receiver element 240 of data communications equipment 200.

Similarly, the receiver of a Mu-law modem is modified to search for the known pattern. More specifically, receiver element 240 of DCE 200 includes segment one detector 810 and sequence detector 805 as shown in FIG. 6. Time-slot access device 260 provides a sequence of received 8-bit PCM samples in parallel form on line 241. Seven of the eight PCM bits are represented by line 807 and are applied to DSP 230 and to segment one detector 810. Bit 7 of the eight PCM bits is conveyed by line 806, which is applied to DSP 230 and to sequence detector 805. In accordance with the methods described above, at the appropriate phase in the connection process, DSP 230 enables segment one detector 810 via line 238. When segment one detector 810 detects a segment one sample, it clocks sequence detector 805 via line 813. DSP 230 controls sequence detector 805 to search for either scrambled marks or spaces via line 239. When sequence detector 805 detects the required number of bits of either sequence, it informs the DSP 230 via control line 242. One illustrative value for the required number of bits is at least 30 scrambled marks or at least 30 scrambled spaces. DSP 230 then responds to this signal as described previously in accordance with FIGS. 3 or 4, appropriately. For example, in step 530, DSP 230 determines whether a probe signal representing scrambled marks has been detected by sequence detector 805, via line 242, and keeps track, via a counter (not shown), whether scrambled marks have been detected for the required time intervals (if any).

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g. transmit element 250, etc., the functions of any one or more of those building blocks can be carried out using one or more appropriate programmed processors, e.g., a digital signal processor.

In addition, the inventive technique can be used with any modulation scheme that provides duplex communication, and can also be used with voice communications as well, e.g., such as switching to voice plus video upon detection of the all-digital connection. Also, although illustrated in the context of a probe signal represented by a scrambled marks or a scrambled spaces signal, other forms of probe signals are possible. Further, other modifications to the above-described handshaking method are possible. For example, even after the transition to a digital mode of operation, the probe signal could still be transmitted as part of a preamble for the all digital data stream. This preamble could simply be a stream of continuous samples of the same value to which the probe signal is added for some brief period of time.

Finally, although described in the context of modifying the seventh bit of a PCM sample, it should be realized that the probe signal could be inserted into other bits of a PCM sample. For example, in those all-digital circuits that do not use the eighth bit for signaling, the probe signal could be put into the seventh and eighth bits of a PCM sample. These all-digital circuits without in-band signaling allow digital communication at 64 kbps instead of 56 kbps.

What is claimed:

1. Data communications equipment apparatus comprising:

a processor that provides a pulse code modulated signal, wherein the pulse code modulated signal comprises a sequence of samples, each sample comprising a number of bits; and circuitry that modifies at least one of the bits of at least one of the samples of the sequence with predetermined probe signal to provide a modified pulse code modulated signal for transmission to an opposite end point wherein the circuitry modifies the at least one sample of the pulse code modulated signal only if the respective sample is a segment one sample.

2. The apparatus of claim 1 wherein the circuitry includes:

a sequence generator for providing the predetermined probe signal;

a selector for modifying the at least one of the number of bits of the at least one sample with the predetermined probe signal; and a segment detector responsive to at least some of the number of bits of each sample of the pulse code modulated signal for controlling when the selector modifies the at least one of the number bits of the at least one sample.

3. Data communications equipment apparatus comprising:

receiver circuitry for providing a received modified pulse code modulated signal from a communications channel, wherein the pulse code modulated signal comprises a sequence of samples, each sample comprising a number of bits;

detection circuitry responsive to each sample for detecting the presence of a predetermined probe signal; and a processor responsive to the detection of the predetermined probe signal for switching to an all-digital mode of operation wherein the detection circuitry includes:

a probe signal detector for detecting the presence of the predetermined probe signal in each sample; and a segment detector for detecting whether each sample is a segment one sample and for controlling when the probe signal detector detects for the presence of the predetermined probe signal in response thereto.

4. A method for use in data communications equipment for detecting an all-digital data connection, the method comprising the steps of:

generating a pulse code modulated signal, where the pulse code modulated signal comprises a sequence of samples each sample including a number of bits;

adding a predetermined probe signal to at least one of the number of bits of at least one of the samples to provide a modified pulse code modulated signal including the step of detecting if the at least one sample is a segment one sample as a precondition to performing the adding step.

5. A method for use in data communications equipment for detecting an all-digital data connection the method comprising the steps of:

receiving a pulse code modulated signal where the pulse code modulated signal comprises a sequence of samples, each sample including a number of bits;

monitoring each sample to detect the presence of a predetermined probe signal; and switching to an all-digital mode of operation if the predetermined probe signal was detected in the monitoring step including the step of detecting if each sample is a segment one sample as a precondition to performing the monitoring step.

6. A method for use in data communications equipment for detecting an all-digital data connection during a handshaking phase, the method comprising the steps of:

a) generating a pulse code modulated signal, where the pulse code modulated signal comprises a sequence of samples, each sample including a number of bits;

b) modifying the pulse code modulated signal for transmission to an opposite endpoint by adding a first predetermined probe signal to at least one of the number of bits of at least one of the samples;

c) monitoring each sample of a received pulse code modulated signal for a second predetermined probe signal;

d) modifying the pulse code modulated signal for transmission to an opposite endpoint by adding a third predetermined probe signal to at least one of the number of bits of at least one of the samples if the second predetermined probe signal was detected in step c);

e) monitoring each sample of the received pulse code modulated signal for a fourth predetermined probe signal; and f) switching to an all-digital mode of operation if the fourth predetermined probe signal was detected in step e).

7. The method of claim 6 wherein the first predetermined probe signal and the second predetermined probe signal are a first type of signal format, and the third predetermined probe signal and the fourth predetermined probe signal are a second type of signal format.

8. The method of claim 7 wherein the first type of signal format is a scrambled marks format and the second type of signal format is a scrambled spaces format.

* * * * *